(12) United States Patent
Ernst (10) Patent No.: US 10,241,126 B2
(45) Date of Patent: Mar. 26, 2019

(54) POWERLESS ENVIRONMENTAL DATA RECORDER (71) Applicant: Hamilton Sundstrand Corporation, Charlotte, NC (US)

(72) Inventor: Jeffrey Ernst, Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 67 days.

(21) Appl. No.: 15/469,033

(22) Filed: Mar. 24, 2017

(65) Prior Publication Data
US 2018/0275156 A1 Sep. 27, 2018

(51) Int. Cl.
G01P 15/03 (2006.01)
G01P 15/06 (2006.01)
G01P 1/12 (2006.01)
G01P 1/14 (2006.01)
G01P 15/18 (2013.01)

(52) U.S. Cl.
CPC ............ *G01P 1/127* (2013.01); *G01P 1/14* (2013.01); *G01P 15/036* (2013.01); *G01P 15/06* (2013.01); *G01P 15/18* (2013.01)

(58) Field of Classification Search
CPC ........ G01P 15/036; G01P 15/06; G01P 15/03; G01P 15/032; G01P 1/127
See application file for complete search history.

(56) References Cited

U.S. PATENT DOCUMENTS 3,167,965 A 2/1965 Peterson
6,272,901 B1 * 8/2001 Takeuchi ............. G01M 7/08
   73/12.01
6,698,272 B1 3/2004 Almirante
7,926,194 B2 4/2011 Katoh et al.
8,074,489 B2 * 12/2011 Ishikawa ............. G01D 3/10
   116/202
9,887,356 B2 * 2/2018 McAlpine ........... H01L 51/0004
(Continued)

FOREIGN PATENT DOCUMENTS

JP 2012198117 A 10/2012
WO WO0161362 A1 8/2001
WO WO2009081084 A2 7/2009

OTHER PUBLICATIONS

Extended European Search Report for EP Application No. 18163387.6, dated May 4, 2018, 7 Pages.

*Primary Examiner* — Ryan D Walsh
(74) *Attorney, Agent, or Firm* — Kinney & Lange, P.A.

(57) ABSTRACT

An environmental data recorder includes an enclosure, a first acceleration recorder array positioned on a first inner surface of the enclosure corresponding to an x-z plane defined by an x-axis and a z-axis, a second acceleration recorder array positioned on a second inner surface of the enclosure corresponding to an x-y plane defined by the x-axis and a y-axis, and a third acceleration recorder array positioned on a third inner surface of the enclosure corresponding to a y-z plane defined by the y-axis and the z-axis. The x-axis, the y-axis, and the z-axis are orthogonal axes. The first, second, and third acceleration recorder arrays each include a plurality of beams cantilevered at first ends from a base attached to an inner surface of the enclosure and a plurality of known masses associated with the beams. The beams are configured to deform or break when exposed to different g loads.

20 Claims, 5 Drawing Sheets (56) References Cited

U.S. PATENT DOCUMENTS

| | | | | |
|---|---|---|---|---|
| 2011/0313684 A1* | 12/2011 | Furrer | ............... | B01L 3/5021 |
| | | | | 702/41 |
| 2012/0312224 A1* | 12/2012 | Branch | ............ | G01L 5/0052 |
| | | | | 116/203 |
| 2015/0082861 A1* | 3/2015 | Gibson | ............ | G01L 5/0052 |
| | | | | 73/12.04 |

* cited by examiner

Fig. 2B ined based
POWERLESS ENVIRONMENTAL DATA RECORDER

BACKGROUND

The present invention relates to diagnostics, and in particular, to diagnostics for components exposed to acceleration.

Components are exposed to varying environments when used in the field. Sometimes components may be exposed to field environments that are harsher than expected or harsher than the components were designed to handle. As a result, components may break or fail in some way during use. Data indicating the maximum conditions a given component has been exposed to is helpful in investigating the root cause of component failures. A simple way to gather information regarding actual field environments of components is needed.

SUMMARY

An environmental data recorder includes an enclosure, a first acceleration recorder array positioned on a first inner surface of the enclosure corresponding to an x-z plane defined by an x-axis and a z-axis, a second acceleration recorder array positioned on a second inner surface of the enclosure corresponding to an x-y plane defined by the x-axis and a y-axis, and a third acceleration recorder array positioned on a third inner surface of the enclosure corresponding to a y-z plane defined by the y-axis and the z-axis. The x-axis, the y-axis, and the z-axis are orthogonal axes. The first acceleration recorder array includes a plurality of first beams cantilevered at first ends from a base attached to the first inner surface of the enclosure and a plurality of known first masses associated with the first beams. The first beams are configured to deform or break when exposed to different g loads. The second acceleration recorder array includes a plurality of second beams cantilevered at first ends from a base attached to the second inner surface of the enclosure and a plurality of known second masses associated with the second beams. The second beams are configured to deform or break when exposed to different g loads. The third acceleration recorder array includes a plurality of third beams cantilevered at first ends from a base attached to the third inner surface of the enclosure and a plurality of known third masses associated with the third beams. The third beams are configured to deform or break when exposed to different g loads.

A method of determining a field environment of a component includes examining an environmental data recorder that was on a component exposed to a field environment. The environmental data recorder includes an enclosure, a first acceleration recorder array positioned on a first inner surface of the enclosure corresponding to an x-z plane defined by an x-axis and a z-axis, a second acceleration recorder array positioned on a second inner surface of the enclosure corresponding to an x-y plane defined by the x-axis and a y-axis, and a third acceleration recorder array positioned on a third inner surface of the enclosure corresponding to a y-z plane defined by the y-axis and the z-axis. The x axis, the y axis, and the z axis are orthogonal axes. The first acceleration recorder array includes a plurality of first beams cantilevered at first ends from a base attached to the first inner surface of the enclosure and a plurality of known first masses associated with the first beams. The first beams are configured to deform or break when exposed to different g loads. The second acceleration recorder array includes a plurality of second beams cantilevered at first ends from a base attached to the second inner surface of the enclosure and a plurality of known second masses associated with the second beams. The second beams are configured to deform or break when exposed to different g loads. The third acceleration recorder array includes a plurality of third beams cantilevered at first ends from a base attached to the third inner surface of the enclosure and a plurality of known third masses associated with the third beams. The third beams are configured to deform or break when exposed to different g loads. A maximum g load range the component was exposed to in the field environment is determined based on the deformed or broken beams.

DETAILED DESCRIPTION

In general, the present disclosure is a powerless environmental data recorder of single-piece construction for attaching to a component. The environmental data recorder has an enclosure that contains three acceleration recorder arrays made up of notched cantilevered beams with known masses at the ends. The beams and masses are designed such that the beams deform or break at the notches when exposed to different g loads in order to mechanically indicate the maximum level of acceleration the component was exposed to in all three axes.

Figure 1A:
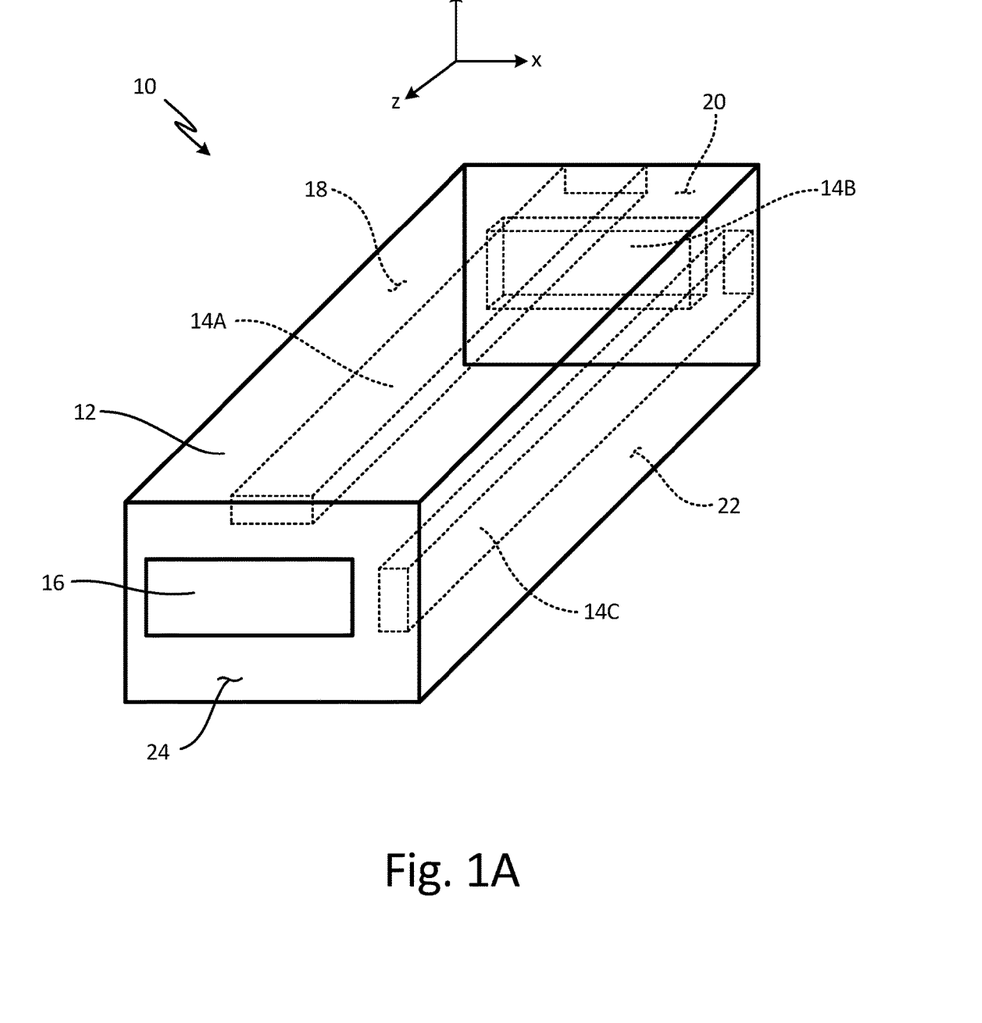
FIG. 1A is a schematic view of an environmental data recorder showing an enclosure and a plurality of acceleration recorder arrays positioned on surfaces of the enclosure.
Figure 1B:
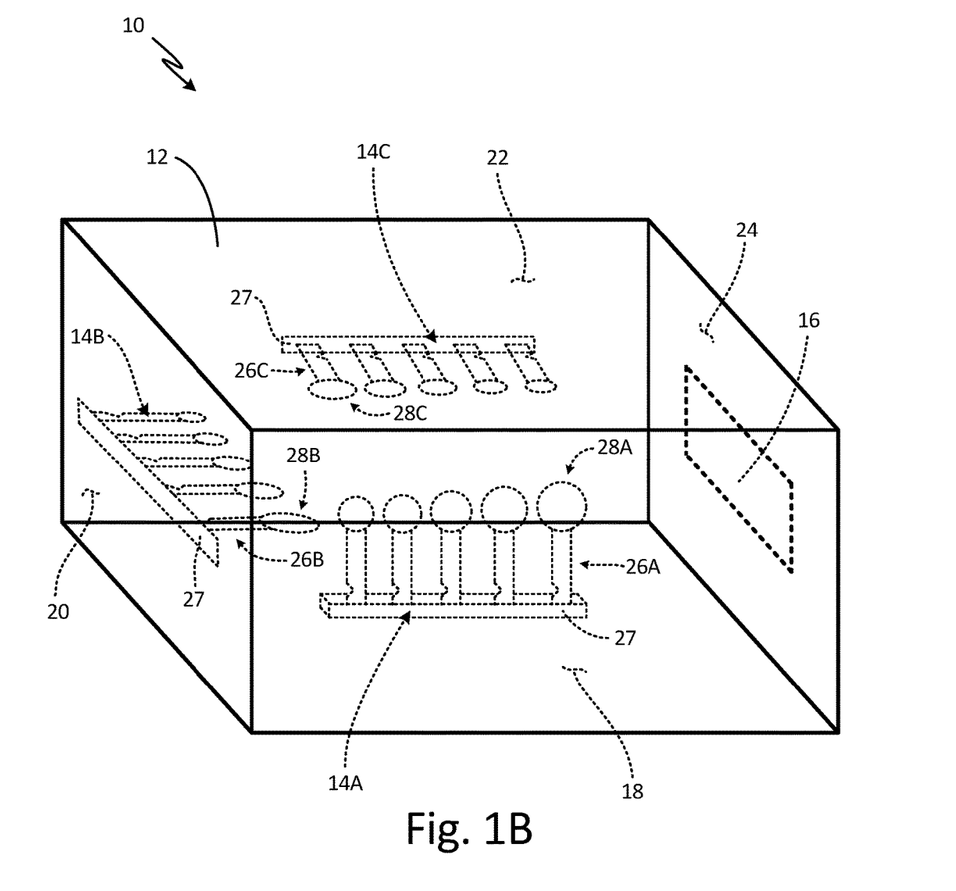
FIG. 1B is a perspective view of the environmental data recorder showing the enclosure and the plurality of acceleration recorder arrays positioned on surfaces of the enclosure.
Figure 1C:
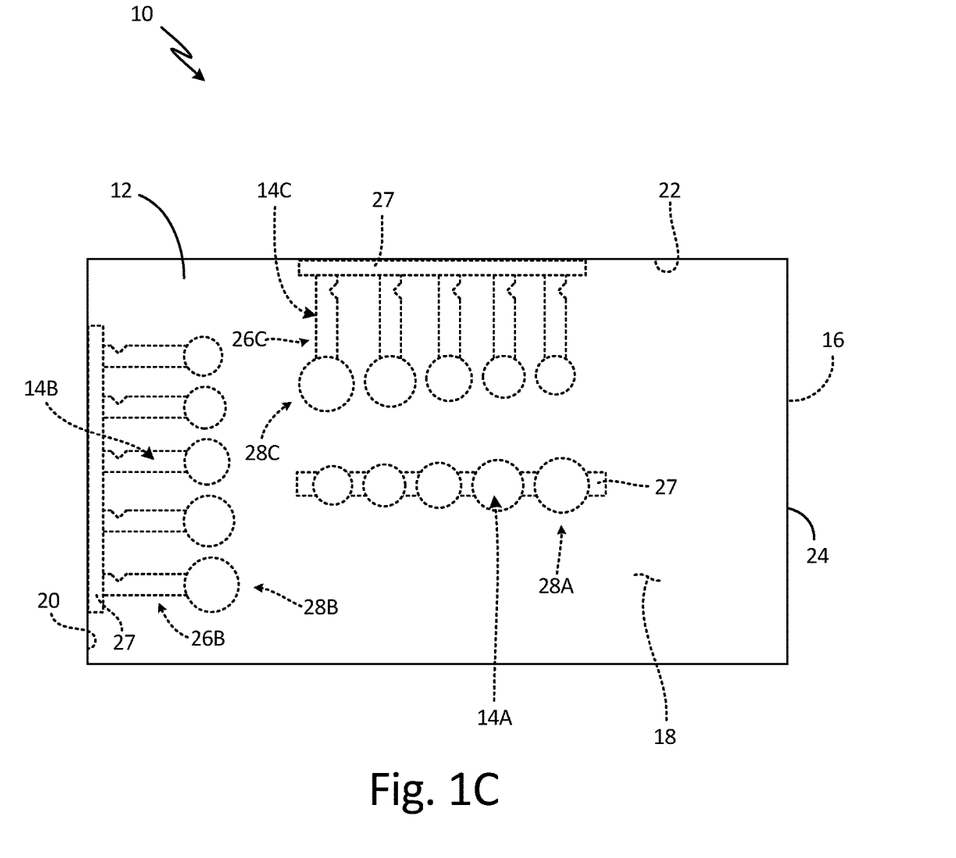
FIG. 1C is a top view of the environmental data recorder showing the enclosure and the plurality of acceleration recorder arrays positioned on surfaces of the enclosure.

FIG. 1A is a schematic view of environmental data recorder 10 showing enclosure 12 with a plurality of acceleration recorder arrays 14 positioned on surfaces 18, 20, and 22 of enclosure 12. FIG. 1B is a perspective view of environmental data recorder 10 showing enclosure 12 and a plurality of acceleration recorder arrays 14 positioned on surfaces 18, 20, and 22 of enclosure 12. FIG. 1C is a top view of environmental data recorder 10 showing enclosure 12 and a plurality of acceleration recorder arrays 14 positioned on surfaces 18, 20, and 22 of enclosure 12. FIGS. 1A, 1B, and 1C will be discussed together. Environmental data recorder 10 includes enclosure 12, acceleration recorder arrays 14, including first acceleration recorder array 14A, second acceleration recorder array 14B, and third acceleration recorder array 14C, and temperature detector 16. Enclosure 12 includes first surface 18, second surface 20, third surface 22, and fourth surface 24. Acceleration recorder arrays 14 have cantilevered beams 26, including beams 26A, 26B, and 26C, (shown in FIGS. 1B and 1C), bases 27 (shown in FIGS. 1B and 1C), and masses 28, includes masses 28A, 28B, and 28C, (shown in FIGS. 1B and 1C).

Enclosure 12 has acceleration recorder arrays 14, including 14A, 14B, and 14C, positioned interior to enclosure 12, and temperature detector 16 positioned exterior to enclosure 12. First surface 18, second surface 20, and third surface 22 are inner surfaces of enclosure 12. First surface 18 corresponds to an x-z plane of enclosure 12, second surface 20 corresponds to an x-y plane of enclosure 12, and third surface 22 corresponds to a y-z plane of enclosure 12. Fourth surface 24 is an outer surface of enclosure 12. Enclosure 12 may be a box with a base, a top, and sides. First acceleration recorder array 14A is positioned on first surface 18 and features cantilevered first beams 26A that extend out in the direction of the y-axis. First masses 28A are connected to first beams 26A. Second acceleration recorder array 14B is positioned on second surface 20 and features cantilevered second beams 26B that extend out in the direction of the z-axis. Second masses 28B are connected to second beams 26B. Third acceleration recorder array 14C is positioned on third surface 22 and features cantilevered third beams 26C that extend out in the direction of the x-axis. Third masses 28C are connected to third beams 26C. Masses 28 are associated with beams 26 such that masses 28 may be attached at ends of beams 26, distributed within beams 26, or distributed along lengths of beams 26. In alternate embodiments, enclosure 12 may only have one or two acceleration recorder arrays 14. Temperature detector 16 is attached to fourth surface 24. In alternate embodiments, temperature detector 16 may be on any suitable surface of enclosure 12. Temperature detector 16 may be a sticker that is adhered to fourth surface 24. Temperature detector 16 can be attached after environmental data recorder 10, not including temperature detector 16, is constructed. Environmental data recorder 10 may not include temperature detector 16.

Environmental data recorder 10, not including temperature detector 16, is of a single-piece construction such that environmental data recorder 10 is a unitary piece. Environmental data recorder 10 may be made of a single material and may be made using additive manufacturing. Environmental data recorder 10 may be made of metal or any other suitable material. The conditions to which the component will be subjected are factored into determining which materials are suitable for environmental data recorder 10. For example, metal may be used for environmental data recorder 10 if environmental data recorder 10 is destined for a higher temperature environment while plastic may be used for environmental data recorder 10 if environmental data recorder 10 is destined for a lower temperature environment and a component requiring environmental data recorder 10 to be lighter in weight. As such, environmental data recorder 10 can be customized to the environment and component in which it will be placed. In one embodiment, environmental data recorder 10 may be customized for an environment experiencing temperatures up to a range of about 500 degrees to 600 degrees. Environmental data recorder may also be customized for an environment experiencing g loads up to a range of, for example, about 40 g to 50 g. In alternate embodiments, enclosure 12 may be a single unitary structure. Further, in alternate embodiments, each of acceleration recorder arrays 14 may be a single unitary structure.

Enclosure 12 protects acceleration recorder arrays 14, including 14A, 14B, and 14C. Enclosure 12 also provides structure for attaching environmental data recorder 10 to a component. Each of acceleration recorder arrays 14, including 14A, 14B, and 14C, records g loads or levels of acceleration in two axes. First acceleration recorder array 14A records g loads in the x-axis and the z-axis. Second acceleration recorder array 14B records g loads in the y-axis and the x-axis. Third acceleration recorder array 14C records g loads in the z-axis and the y-axis. First acceleration recorder array 14A indicates the g loads in the x-axis and the z-axis to which environmental data recorder 10 was exposed. Second acceleration recorder array 14B indicates the g loads in the y-axis and the x-axis to which environmental data recorder 10 was exposed. Third acceleration recorder array 14C indicates the g loads in the z-axis and the y-axis to which environmental data recorder 10 was exposed. Cumulatively, acceleration recorder arrays 14A, 14B, and 14C record the g loads to which environmental data recorder 10 was exposed in all three axes. Recorded g loads can be used to detect the maximum g loads or acceleration in all three axes to which the environmental data recorder 10 was exposed. If environmental data recorder 10 has only one or two acceleration recorder arrays 14, the maximum g load and thus acceleration to which environmental data recorder 10 was exposed can be detected, though in which of the three axes the acceleration occurred is not necessarily identifiable.

Temperature detector 16 records the maximum temperature experienced by environmental data recorder 10. For example, temperature detector 16 may include chemicals that react at different known temperatures. The chemicals change color based on the progression of the reactions. Once the chemicals reach a certain color, the color will not change back to any previous colors that were reached at lower temperatures. Thus, the color will not change in response to cooling. As such, the color indicates the maximum temperature to which the component was exposed. The maximum temperature will correspond to the temperature at the point of attachment of temperature detector 16.

Environmental data recorder 10 can be fixed to a component before it enters the field. Examination of the environmental data recorder 10 after the component has been exposed to field conditions will mechanically indicate the maximum level of acceleration and temperature to which the component was subjected in the field in all three axes.

Figure 2A:
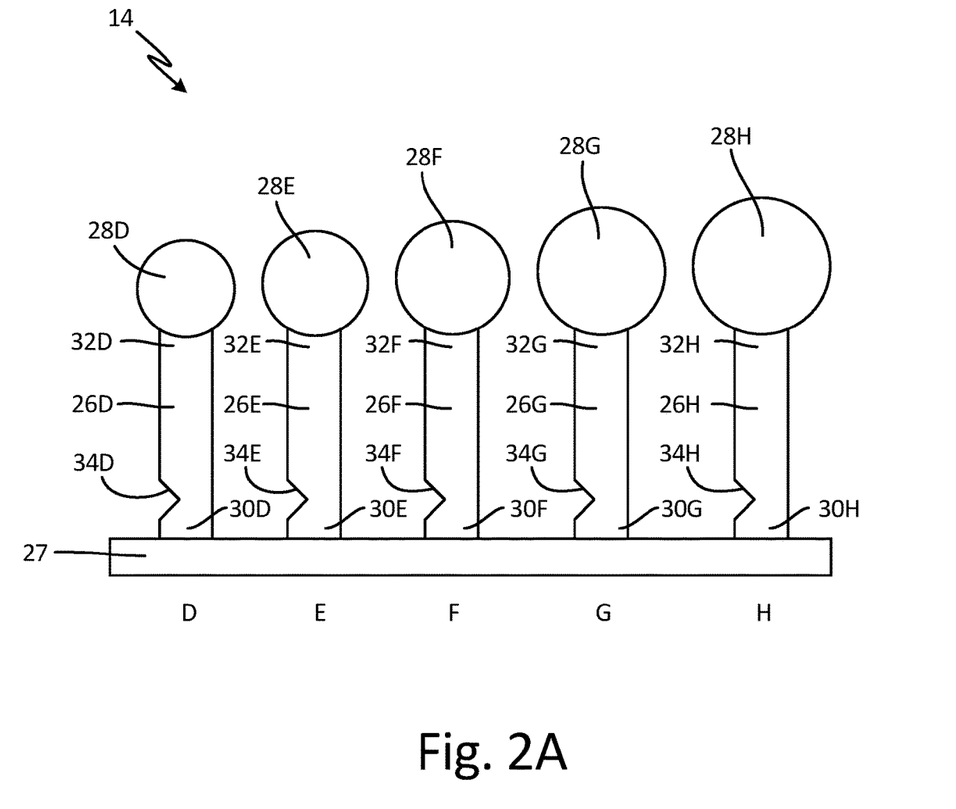
FIG. 2A is a front view of an acceleration recorder array according to a first embodiment.

FIG. 2A is a front view of acceleration recorder array 14 according to a first embodiment. Acceleration recorder array 14 has beams 26, including 26D, 26E, 26F, 26G, 26H, base 27, and masses 28, including 28D, 28E, 28F, 28G, and 28H. Beams 26, including 26D, 26E, 26F, 26G, 26H have first ends 30, including 30D, 30E, 30F, 30G, and 30H, second ends 32, including 32D, 32E, 32F, 32G, and 32H, and notches 34, including 34D, 34E, 34F, 34G, and 34H. Beam 26D has first end 30D, second end 32D, and notch 34D. Beam 26E has first end 30E, second end 32E, and notch 34E. Beam 26F has first end 30F, second end 32F, and notch 34F. Beam 26G has first end 30G, second end 32G, and notch 34G. Beam 26H has first end 30H, second end 32H, and notch 34H. Also shown in FIG. 2A are acceleration levels D, E, F, G, and H.

Plurality of beams 26 including 26D, 26E, 26F, 26G, and 26H are arranged in an array and connected to base 27 and to masses 28 including 28D, 28E, 28F, 28G, and 28H, respectively. Beam 26D is connected at first end 30D to base 27 such that it is cantilevered from base 27. Beam 26D is connected to mass 28D at second end 32D. Beam 26D has notch 34D adjacent to first end 30D. Beam 26E is connected at first end 30E to base 27 such that it is cantilevered from base 27. Beam 26E is connected to mass 28E at second end 32E. Beam 26E has notch 34E adjacent to first end 30E. Beam 26F is connected at first end 30F to base 27 such that it is cantilevered base 27. Beam 26F is connected to mass 28F at second end 32F. Beam 26F has notch 34F adjacent to first end 30F. Beam 26G is connected at first end 30G to base 27 such that it is cantilevered from base 27. Beam 26G is connected to mass 28G at second end 32G. Beam 26G has notch 34G adjacent to first end 30G. Beam 26H is connected at first end 30H to base 27 such that it is cantilevered from base 27. Beam 26H is connected to mass 28H at second end 32H. Beam 26H has notch 34H adjacent to first end 30H.

Acceleration recorder array 14 may have any number of beams 26 with masses 28. Base 27 may be rectangular and is configured to attach to first surface 18, second surface 20, or third surface 22 of enclosure 12. In alternate embodiments, base 27 is part of an interior wall of enclosure 12. Masses 28 including 28D, 28E, 28F, 28G, and 28H are known masses. Masses 28D, 28E, 28F, 28G, and 28H increase in mass such that mass 28D has the smallest mass and mass 28H has the largest mass. In alternate embodiments, masses 28 are the same mass and beams 26 are of different lengths. Masses 28 may be spheres or any other suitable shape. Each notch 34 is a portion of beam 26 having a reduced cross-sectional area. In alternate embodiments, notches 34 may be placed in any suitable location on beams 26. Acceleration recorder array 14 may be made using additive manufacturing. If additive manufacturing is not used, in alternate embodiments, beams 26 may be fixed to base 27 and base 27 may be fixed to first surface 18, second surface 20, or third surface 22 of enclosure 12 with fasteners. In that case, beams 26 and base 27 would also include locations for fasteners, such as screws, to thread into beams 26 at first ends 30 and to thread into base 27.

Beams 26D, 26E, 26F, 26G, and 26H are designed to deform or break at notches 34D, 34E, 34F, 34G, 34H, respectively, when exposed to g loads corresponding to specific levels of acceleration. Beams 26, including 26D, 26E, 26F, 26G, and 26H, deform or break in a short amount of time once at the required g load. Notches 34D, 34E, 34F, 34G, 34H concentrate stress at known locations such that beams 26D, 26E, 26F, 26G, and 26H deform or break at designated points. More specifically, beams 26D, 26E, 26F, 26G, and 26H are configured to deform or break at acceleration levels D, E, F, G, and H, respectively.

In this embodiment, beams 26D, 26E, 26F, 26G, and 26H will deform or break in reverse consecutive order, from 26H to 26D, because the larger the mass connected to beam 26, the more susceptible beam 26 is to deforming or breaking. For example, beam 26H may be configured to deform or break at notch 34H when exposed to a g load corresponding to 5 g, beam 26G may be configured to deform or break at notch 34G when exposed to a g load corresponding to 10 g, beam 26F may be configured to deform or break at notch 34F when exposed to a g load corresponding to 15 g, beam 26E may be configured to deform or break at notch 34E when exposed to a g load corresponding to 20 g, and beam 26D may be configured to deform or break at notch 34D when exposed to a g load corresponding to 25 g. Designated levels of acceleration D, E, F, G, and H may vary depending on the field environment of the component. Additionally, designated increments in acceleration levels D, E, F, G, and H may vary depending on the required specificity of measurement. For example, beams 26D, 26E, 26F, 26G, and 26H can be designed to deform or break at 1 g increments. In this embodiment, beams 26D, 26E, 26F, 26G, and 26H are equal in length and masses 28D, 28E, 28F, 28G, and 28H vary in order to cause deforming or breaking at the designated g loads; however, in alternate embodiments, beams 26, masses 28, and notches 34 may be sized in various ways to achieve the proper deforming or breaking points.

Environmental data recorder 10 can be fixed to a component before it enters the field. The component can then be exposed to the field environment. After the component has been subjected to the field environment, environmental data recorder 10 can be examined for deformed or broken beams 26D, 26E, 26F, 26G, and 26H. Based on which of beams 26D, 26E, 26F, 26G, and 26H deformed or broke, the maximum acceleration range to which the component was exposed in the field environment can be determined. For example, if beam 26H is deformed or broken, the component has been exposed to a g load associated with an acceleration level between 5 g and 10 g. If beams 26H and 26G are deformed or broken, the component has been exposed to a g load associated with an acceleration level between 10 g and 15 g. If beams 26H, 26G, 26F are deformed or broken, the component has been exposed to a g load associated with an acceleration level between 15 g and 20 g. If beams 26H, 26G, 26F, and 26E are deformed or broken, the component has been exposed to a g load associated with an acceleration level between 20 g and 25 g. If all of beams 26H, 26G, 26F, 26E and 26D are deformed or broken the component has been exposed to a g load associated with an acceleration level of at least 25 g. Additionally, temperature detector 16 can be examined to determine the maximum temperature to which the component was exposed in the field.

Acceleration recorder arrays 14 can mechanically record or detect the maximum g load range or the acceleration experienced by the component to which environmental data recorder 10 is attached. As such, when a component comes back from the field broken, environmental data recorder 10 acts as a data generation tool to capture the real environment the component was exposed to in the field without requiring electronics or power. Because environmental data recorder 10 collects data to capture the real environment seen by components in the field, it can provide data to support or refute warranty claims. More specifically, environmental data recorder 10 can be used to determine whether the replacement of a component is covered under warranty or whether the component was damaged due to inaccurate design specifications and the warranty is void. For example, the component may have failed because it was subjected to an environment harsher than it was designed to withstand. As such, environmental data recorder 10 reduces the expense of redesign efforts to fix problems that are actually due to poorly defined requirements or design specifications. Additionally, environmental data recorder 10 reduces time spent investigating the root cause of component failures. Furthermore, because it is of one-piece construction, may be made of a single material, has no moving parts, and no electronics, environmental data recorder 10 is simple and relatively inexpensive. It can also be made using additive manufacturing. Examples of components environmental data recorder 10 may be attached to include mechanical valves that wear due to vibration, elevated temperature, or vibration and elevated temperature, heat exchangers that may crack due to vibration, elevated temperature, or vibration and elevated temperature, and turbomachinery having structural loads that may crack due to vibration, elevated temperature, or vibration and elevated temperature.

Figure 2B:
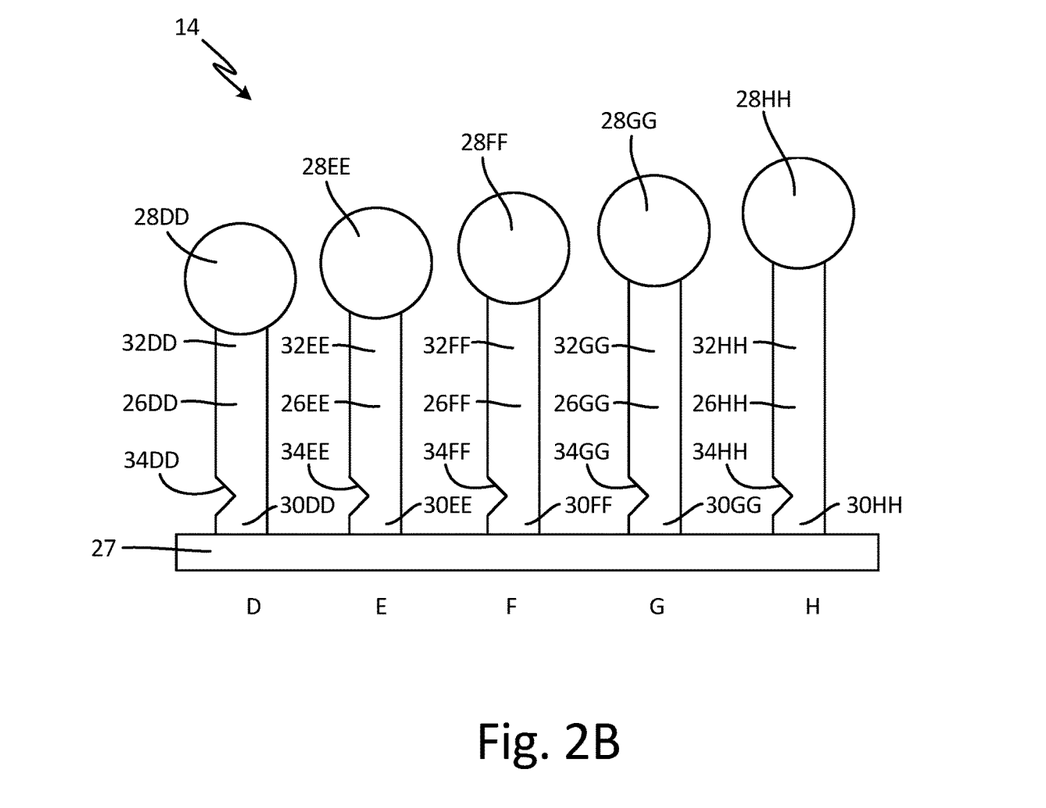
FIG. 2B is a front view of an acceleration recorder array according to a second embodiment.

FIG. 2B is a front view of acceleration recorder array 14 according to a second embodiment. Acceleration recorder array 14 has beams 26, including 26DD, 26EE, 26FF, 26GG, 26HH, base 27, and masses 28, including 28DD, 28EE, 28FF, 28GG, and 28HH. Beams 26, including 26DD, 26EE, 26FF, 26GG, 26HH have first ends 30, including 30DD, 30EE, 30FF, 30GG, and 30HH, second ends 32, including 32DD, 32EE, 32FF, 32GG, and 32HH, and notches 34, including 34DD, 34EE, 34FF, 34GG, and 34HH. Beam 26DD has first end 30DD, second end 32DD, and notch 34DD. Beam 26EE has first end 30EE, second end 32EE, and notch 34EE. Beam 26FF has first end 30FF, second end 32FF, and notch 34FF. Beam 2G6G has first end 30GG, second end 32GG, and notch 34GG. Beam 26HH has first end 30HH, second end 32HH, and notch 34HH. Also shown in FIG. 2B are acceleration levels D, E, F, G, and H.

Plurality of beams 26 including 26DD, 26EE, 26FF, 26GG, and 26HH are arranged in an array and connected to base 27 and to masses 28 including 28DD, 28EE, 28FF, 28GG, and 28HH, respectively. Beam 26DD is connected at first end 30DD to base 27 such that it is cantilevered from base 27. Beam 26DD is connected to mass 28DD at second end 32DD. Beam 26DD has notch 34DD adjacent to first end 30DD. Beam 26EE is connected at first end 30EE to base 27 such that it is cantilevered from base 27. Beam 26EE is connected to mass 28EE at second end 32EE. Beam 26EE has notch 34EE adjacent to first end 30DE. Beam 26FF is connected at first end 30FF to base 27 such that it is cantilevered base 27. Beam 26FF is connected to mass 28FF at second end 32FF. Beam 26FF has notch 34FF adjacent to first end 30FF. Beam 26GG is connected at first end 30GG to base 27 such that it is cantilevered from base 27. Beam 26GG is connected to mass 28GG at second end 32GG. Beam 26GG has notch 34GG adjacent to first end 30GG. Beam 26HH is connected at first end 30HH to base 27 such that it is cantilevered from base 27. Beam 26HH is connected to mass 28HH at second end 32HH. Beam 26HH has notch 34HH adjacent to first end 30HH.

Acceleration recorder array 14 may have any number of beams 26 with masses 28. Beams 26DD, 26EE, 26FF, 26GG, and 26HH increase in length such that beam 26D is the shortest and beam 26H is the longest. In alternate embodiments, beams 26 may be the same length. Base 27 is may be rectangular and is configured to attach to first surface 18, second surface 20, or third surface 22 of enclosure 12. In alternate embodiments, base 27 is part of an interior wall of enclosure 12. Masses 28 including 28DD, 28EE, 28FF, 28GG, and 28HH are known masses. Masses 28DD, 28EE, 28FF, 28GG, and 28HH are the same mass. In alternate embodiments masses 28 may be different masses. Masses 28 may be spheres or any other suitable shape. Each notch 34 is a portion of beam 26 having a reduced cross-sectional area. In alternate embodiments, notches 34 may be placed in any suitable location on beams 26. Acceleration recorder array 14 may be made using additive manufacturing. If additive manufacturing is not used, in alternate embodiments, beams 26 may be fixed to base 27 and base 27 may be fixed to first surface 18, second surface 20, or third surface 22 of enclosure 12 with fasteners. In that case, beams 26 and base 27 would also include locations for fasteners, such as screws, to thread into beams 26 at first ends 30 and to thread into base 27.

Beams 26DD, 26EE, 26FF, 26GG, and 26HH are designed to deform or break at notches 34DD, 34EE, 34FF, 34GG, 34HH, respectively, when exposed to g loads corresponding to specific levels of acceleration. Beams 26, including 26DD, 26EE, 26FF, 26GG, and 26HH, deform or break in a short amount of time once at the required g load. Notches 34DD, 34EE, 34FF, 34GG, 34HH concentrate stress at known locations such that beams 26DD, 26EE, 26FF, 26GG, and 26HH deform or break at designated points. More specifically, beams 26DD, 26EE, 26FF, 26GG, and 26HH are configured to deform or break at acceleration levels D, E, F, G, and H, respectively.

In this embodiment, beams 26DD, 26EE, 26FF, 26GG, and 26HH will deform or break in reverse consecutive order, from 26HH to 26DD, because the longer the beam 26DD, 26EE, 26FF, 26GG, and 26HH, the more susceptible it is to deforming or breaking. For example, beam 26HH may be configured to deform or break at notch 34HH when exposed to a g load corresponding to 5 g, beam 26GG may be configured to deform or break at notch 34GG when exposed to a g load corresponding to 10 g, beam 26FF may be configured to deform or break at notch 34FF when exposed to a g load corresponding to 15 g, beam 26EE may be configured to deform or break at notch 34EE when exposed to a g load corresponding to 20 g, and beam 26DD may be configured to deform or break at notch 34DD when exposed to a g load corresponding to 25 g. Designated levels of acceleration D, E, F, G, H may vary depending on the field environment of the component. Additionally, designated increments in acceleration levels D, E, F, G, and H may vary depending on the required specificity of measurement. For example, beams 26DD, 26EE, 26FF, 26GG, and 26HH can be designed to deform or break at 1 g increments. In this embodiment, masses 28DD, 28EE, 28FF, 28GG, and 28HH are equal and beams 26DD, 26EE, 26FF, 26GG, and 26HH vary in length in order to deform or break at the designated g loads; however, in alternate embodiments, beams 26, masses 28, and notches 34 may be sized in various ways to achieve the proper deforming or breaking points.

Environmental data recorder 10 can be fixed to a component before it enters the field. Environmental data recorder can be fixed to a component using fasteners such as screws, glue, or any other suitable means. The component can then be exposed to the field environment. After the component has been subjected to the field environment, environmental data recorder 10 can be examined for deformed or broken beams 26DD, 26EE, 26FF, 26GG, and 26HH. Based on which of beams 26DD, 26EE, 26FF, 26GG, and 26HH deformed or broke, the maximum acceleration range to which the component was exposed in the field environment can be determined. For example, if beam 26HH is deformed or broken, the component has been exposed to a g load associated with an acceleration level between 5 g and 10 g. If beams 26HH and 26GG are deformed or broken, the component has been exposed to a g load associated with an acceleration level between 10 g and 15 g. If beams 26HH, 26GG, 26FF are deformed or broken, the component has been exposed to a g load associated with an acceleration level between 15 g and 20 g. If beams 26HH, 26GG, 26FF, and 26EE are deformed or broken, the component has been exposed to a g load associated with an acceleration level between 20 g and 25 g. If all of beams 26HH, 26GG, 26FF, 26EE and 26DD are deformed or broken the component has been exposed to a g load associated with an acceleration level of at least 25 g. Additionally, temperature detector 16 can be examined to determine the maximum temperature to which the component was exposed in the field.

Acceleration recorder arrays 14 can mechanically record or detect the maximum g load range or the acceleration experienced by the component to which environmental data recorder 10 is attached. As such, when a component comes back from the field broken, environmental data recorder 10 acts as a data generation tool to capture the real environment the component was exposed to in the field without requiring electronics or power. Because environmental data recorder 10 collects data to capture the real environment seen by components in the field, it can provide data to support or refute warranty claims. More specifically, environmental data recorder 10 can be used to determine whether the replacement of a component is covered under warranty or whether the component was damaged due to inaccurate design specifications and the warranty is void. For example, the component may have failed because it was subjected to an environment harsher than it was designed to withstand. As such, environmental data recorder 10 reduces the expense of redesign efforts to fix problems that are actually due to poorly defined requirements or design specifications. Additionally, environmental data recorder 10 reduces time spent investigating the root cause of component failures. Furthermore, because it is of one-piece construction, may be made of a single material, has no moving parts, and no electronics, environmental data recorder 10 is simple and relatively inexpensive. It can also be made using additive manufacturing. Examples of components environmental data recorder 10 may be attached to include mechanical valves that wear due to vibration, elevated temperature, or vibration and elevated temperature, heat exchangers that may crack due to vibration, elevated temperature, or vibration and elevated temperature, and turbomachinery having structural loads that may crack due to vibration, elevated temperature, or vibration and elevated temperature.

FIGS. 2A and 2B are examples of configurations that cause beams 26 to deform or break when exposed to different g loads or different levels of acceleration. Beams 26 can be configured to deform or break due to exposure to different selected g loads based on any number of characteristics, alone or in combination, including: length of beam 27, mass of beam 27, mass of mass 28, amount of reduction in cross-sectional area of beams 26, and density of an area of beam 26 near base 27.

Discussion of Possible Embodiments

The following are non-exclusive descriptions of possible embodiments of the present invention.

An environmental data recorder includes an enclosure; and a first acceleration recorder array positioned on a first inner surface of the enclosure corresponding to an x-z plane defined by an x-axis and a z-axis, the first acceleration recorder array including: a plurality of first beams cantilevered at first ends from a base attached to the first inner surface of the enclosure; and a plurality of known first masses associated with the first beams; wherein the first beams are configured to deform or break when exposed to different g loads; a second acceleration recorder array positioned on a second inner surface of the enclosure corresponding to an x-y plane defined by the x-axis and a y-axis, the second acceleration recorder array including: a plurality of second beams cantilevered at first ends from a base attached to the second inner surface of the enclosure; and a plurality of known second masses associated with the second beams; wherein the second beams are configured to deform or break when exposed to different g loads; and a third acceleration recorder array positioned on a third inner surface of the enclosure corresponding to a y-z plane defined by the y-axis and the z-axis, the third acceleration recorder array including: a plurality of third beams cantilevered at first ends from a base attached to the third inner surface of the enclosure; and a plurality of known third masses associated with the third beams; wherein the third beams are configured to deform or break when exposed to different g loads; wherein the x-axis, the y-axis, and the z-axis are orthogonal axes.

The environmental data recorder of the preceding paragraph can optionally include, additionally and/or alternatively, any one or more of the following features, configurations and/or additional components:

A temperature detector attached to a surface of the enclosure.

The plurality of first beams of the first acceleration recorder array extend in a direction of the y-axis, the plurality of second beams of the second acceleration recorder array extend in a direction of the z-axis, and the plurality of third beams of the third acceleration recorder array extend in a direction of the x-axis.

Each beam includes a portion having a reduced cross-sectional area near the first end.

The beams are configured to break at the portions having reduced cross-sectional areas when exposed to different g loads.

The masses are spheres.

The environmental data recorder is of a single-piece construction.

The environmental data recorder is made of a single material

The environmental data recorder is made using additive manufacturing.

The environmental data recorder is made of metal.

The beams are arranged in a series.

The enclosure further comprises a base, a top, and sides.

The enclosure is a box.

The beams vary in length in order to break at designated g loads.

The masses associated with the beams vary in order to break the beams at designated g loads.

The acceleration recorder arrays are of single-piece construction.

A method of determining a field environment of a component includes: examining an environmental data recorder that was on a component exposed to a field environment, the environmental data recorder including: an enclosure; a first acceleration recorder array positioned on a first inner surface of the enclosure corresponding to an x-z plane defined by an x-axis and a z-axis, the first acceleration recorder array including: a plurality of first beams cantilevered at first ends from a base attached to the first inner surface of the enclosure; and a plurality of known first masses associated with the first beams; wherein the first beams are configured to deform or break when exposed to different g loads; a second acceleration recorder array positioned on a second inner surface of the enclosure corresponding to an x-y plane defined by the x-axis and a y-axis, the second acceleration recorder array including: a plurality of second beams cantilevered at first ends from a base attached to the second inner surface of the enclosure; and a plurality of known second masses associated with the second beams; wherein the second beams are configured to deform or break when exposed to different g loads; and a third acceleration recorder array positioned on a third inner surface of the enclosure corresponding to a y-z plane defined by the y-axis and the z-axis, the third acceleration recorder array including: a plurality of third beams cantilevered at first ends from a base attached to the third inner surface of the enclosure; and a plurality of known third masses associated with the third beams; wherein the third beams are configured to deform or break when exposed to different g loads; wherein the x-axis, the y-axis, and the z-axis are orthogonal axes; and determining a maximum g load range the component was exposed to in the field environment based on the deformed or broken beams.

The method of the preceding paragraph can optionally include, additional and/or alternatively, any one or more of the following features, configurations, and/or additional components:

Examining a temperature detector attached to a surface of the enclosure to determine the maximum temperature the component was exposed to in the field.

The plurality of first beams of the first acceleration recorder array extend in a direction of the y-axis, the plurality of second beams of the second acceleration recorder array extend in a direction of the z-axis, and the plurality of third beams of the third acceleration recorder array extend in a direction of the x-axis.

Determining a maximum g load range the component was exposed to in the field environment in the x-axis, the y-axis, and the z-axis based on the deformed or broken beams from the first acceleration recorder array, the second acceleration recorder array, and the third acceleration recorder array.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An environmental data recorder comprising:
   an enclosure; and
   a first acceleration recorder array positioned on a first inner surface of the enclosure corresponding to an x-z plane defined by an x-axis and a z-axis, the first acceleration recorder array including:
      a plurality of first beams cantilevered at first ends from a base attached to the first inner surface of the enclosure; and
      a plurality of known first masses associated with the first beams;
      wherein the first beams are configured to deform or break when exposed to different g loads;
   a second acceleration recorder array positioned on a second inner surface of the enclosure corresponding to an x-y plane defined by the x-axis and a y-axis, the second acceleration recorder array including:
      a plurality of second beams cantilevered at first ends from a base attached to the second inner surface of the enclosure; and
      a plurality of known second masses associated with the second beams;
      wherein the second beams are configured to deform or break when exposed to different g loads; and
   a third acceleration recorder array positioned on a third inner surface of the enclosure corresponding to a y-z plane defined by the y-axis and the z-axis, the third acceleration recorder array including:
      a plurality of third beams cantilevered at first ends from a base attached to the third inner surface of the enclosure; and
      a plurality of known third masses associated with the third beams;
      wherein the third beams are configured to deform or break when exposed to different g loads;
   wherein the x-axis, the y-axis, and the z-axis are orthogonal axes, and the environmental data recorder is of a single-piece construction.

2. The environmental data recorder of claim 1 and further comprising a temperature detector attached to a surface of the enclosure.

3. The environmental data recorder of claim 1, wherein the plurality of first beams of the first acceleration recorder array extend in a direction of the y-axis, the plurality of second beams of the second acceleration recorder array extend in a direction of the z-axis, and the plurality of third beams of the third acceleration recorder array extend in a direction of the x-axis.

4. The environmental data recorder of claim 1, wherein each beam includes a portion having a reduced cross-sectional area near the first end.

5. The environmental data recorder of claim 4, wherein the beams are configured to break at the portions having reduced cross-sectional areas when exposed to different g loads.

6. The environmental data recorder of claim 1, wherein the masses are spheres.

7. The environmental data recorder of claim 1, wherein the environmental data recorder is made of a single material.

8. The environmental data recorder of claim 1, wherein the environmental data recorder is made using additive manufacturing.

9. The environmental data recorder of claim 1, wherein the environmental data recorder is made of metal.

10. The environmental data recorder of claim 1, wherein the beams are arranged in a series on the base.

11. The environmental data recorder of claim 1, wherein the enclosure further comprises a base, a top, and sides.

12. The environmental data recorder of claim 1, wherein the enclosure is a box.

13. The environmental data recorder of claim 1, wherein the beams vary in length in order to break at designated g loads.

14. The environmental data recorder of claim 1, wherein the masses associated with the beams vary in order to break the beams at designated g loads.

15. The environmental data recorder of claim 1, wherein the acceleration recorder arrays are of single-piece construction.

16. A method of determining a field environment of a component comprising:
   examining an environmental data recorder that was on a component exposed to a field environment, the environmental data recorder including:
      an enclosure;
      a first acceleration recorder array positioned on a first inner surface of the enclosure corresponding to an x-z plane defined by an x-axis and a z-axis, the first acceleration recorder array including:
         a plurality of first beams cantilevered at first ends from a base attached to the first inner surface of the enclosure; and
         a plurality of known first masses associated with the first beams;
         wherein the first beams are configured to deform or break when exposed to different g loads;
      a second acceleration recorder array positioned on a second inner surface of the enclosure corresponding to an x-y plane defined by the x-axis and a y-axis, the second acceleration recorder array including:
         a plurality of second beams cantilevered at first ends from a base attached to the second inner surface of the enclosure; and
         a plurality of known second masses associated with the second beams;
         wherein the second beams are configured to deform or break when exposed to different g loads; and
      a third acceleration recorder array positioned on a third inner surface of the enclosure corresponding to a y-z plane defined by the y-axis and the z-axis, the third acceleration recorder array including:

a plurality of third beams cantilevered at first ends from a base attached to the third inner surface of the enclosure; and
a plurality of known third masses associated with the third beams;
wherein the third beams are configured to deform or break when exposed to different g loads;
wherein the x-axis, the y-axis, and the z-axis are orthogonal axes, and the environmental data recorder is of a single-piece construction; and
determining a maximum g load range the component was exposed to in the field environment based on the deformed or broken beams.

17. The method of claim 16, and further comprising examining a temperature detector attached to a surface of the enclosure to determine the maximum temperature the component was exposed to in the field.

18. The method of claim 16, wherein the plurality of first beams of the first acceleration recorder array extend in a direction of the y-axis, the plurality of second beams of the second acceleration recorder array extend in a direction of the z-axis, and the plurality of third beams of the third acceleration recorder array extend in a direction of the x-axis.

19. The method of claim 18, and further comprising determining a maximum g load range the component was exposed to in the field environment in the x-axis, the y-axis, and the z-axis based on the deformed or broken beams from the first acceleration recorder array, the second acceleration recorder array, and the third acceleration recorder array.

20. An environmental data recorder comprising:
an enclosure; and
a first acceleration recorder array positioned on a first inner surface of the enclosure corresponding to an x-z plane defined by an x-axis and a z-axis, the first acceleration recorder array including:
a plurality of first beams cantilevered at first ends from a base attached to the first inner surface of the enclosure; and
a plurality of known first masses associated with the first beams;
wherein the first beams are configured to deform or break when exposed to different g loads;
a second acceleration recorder array positioned on a second inner surface of the enclosure corresponding to an x-y plane defined by the x-axis and a y-axis, the second acceleration recorder array including:
a plurality of second beams cantilevered at first ends from a base attached to the second inner surface of the enclosure; and
a plurality of known second masses associated with the second beams;
wherein the second beams are configured to deform or break when exposed to different g loads; and
a third acceleration recorder array positioned on a third inner surface of the enclosure corresponding to a y-z plane defined by the y-axis and the z-axis, the third acceleration recorder array including:
a plurality of third beams cantilevered at first ends from a base attached to the third inner surface of the enclosure; and
a plurality of known third masses associated with the third beams;
wherein the third beams are configured to deform or break when exposed to different g loads;
wherein the x-axis, the y-axis, and the z-axis are orthogonal axes, and the environmental data recorder is made of a single material.

* * * * *